(12) United States Patent
Madhavanpillai et al.

(10) Patent No.: US 8,930,062 B2
(45) Date of Patent: Jan. 6, 2015

(54) SYSTEM AND METHOD FOR DETECTING AND ISOLATING FAULTS IN PRESSURE SENSING OF FLUSH AIR DATA SYSTEM (FADS)

(75) Inventors: Jayakumar Madhavanpillai, Thiruvananthapuram (IN); Remesh Narayanan, Thiruvananthapuram (IN); Harish Chandran Soudamini, Thiruvananthapuram (IN); Swaminathan Subramaniaiyer, Thiruvananthapuram (IN); Sivan Kailasavadivoo, Thiruvananthapuram (IN); Sharma Surendra Vir, Thiruvananthapuram (IN)

(73) Assignee: Indian Space Research Organisation, Karnataka (IN)

( * ) Notice: Subject to any disclaimer, the term of this patent is extended or adjusted under 35 U.S.C. 154(b) by 623 days.

(21) Appl. No.: 12/996,391
(22) PCT Filed: Jun. 17, 2009
(86) PCT No.: PCT/IN2009/000349
§ 371 (c)(1),
(2), (4) Date: Oct. 27, 2011
(87) PCT Pub. No.: WO2010/122567
PCT Pub. Date: Oct. 28, 2010

(65) Prior Publication Data
US 2012/0041634 A1    Feb. 16, 2012

(30) Foreign Application Priority Data
Apr. 21, 2009 (IN) .............................. 922/CHE/2009

(51) Int. Cl.
*G01M 17/00* (2006.01)
*G01P 21/02* (2006.01)
(Continued)

(52) U.S. Cl.
CPC ................. *G01P 21/025* (2013.01); *G05B 9/02* (2013.01); *B60T 8/885* (2013.01);
(Continued)

(58) Field of Classification Search
CPC . B60T 8/885; B60T 2270/416; B60T 13/662; G05B 9/02; B60C 23/0408
USPC ............... 335/128; 702/57, 61, 122; 700/291; 701/30.1, 29.9, 30.2; 60/338; 137/115.22, 625.18; 303/13; 188/152, 188/151 A; 340/870.02
See application file for complete search history.

(56) References Cited

U.S. PATENT DOCUMENTS 4,575,587 A * 3/1986 Stokes et al. ................ 379/27.01
4,792,192 A * 12/1988 Tveitane ......................... 303/13
(Continued)

FOREIGN PATENT DOCUMENTS

EP   1293784   3/2003
GB   2432914   6/2007

*Primary Examiner* — Behrang Badii
(74) *Attorney, Agent, or Firm* — Mark M. Friedman

(57) ABSTRACT

A system and method for detecting and isolating faults in pressure ports (2) and pressure transducers (3) of a pressure sensing system are disclosed. The system comprises a set of pressure ports (2) flushed to a nose cap (1) of a space vehicle in crucifix form. Three pressure transducers (3) are connected to each pressure port (2) through pneumatic tubes (4) for measuring surface pressure from the pressure ports (2). Separate power supplying units (7, 8, 9) are connected to the three pressure transducers (3) for powering the pressure transducers (3) at each pressure port (2). A processing unit (10) is configured to acquire voltage inputs corresponding to the measured surface pressure from the pressure transducers (3). The processing unit (10) executes one or more levels of fault checking to detect and isolate pressure transducer failures and blockage of the pressure ports (2) based on the voltage inputs. Hence, it is possible to enhance the accuracy and reliability of the pressure estimation of the FADS, cushion pressure.

10 Claims, 4 Drawing Sheets

(51) Int. Cl.
*G01P 5/16* (2006.01)
*G01P 13/02* (2006.01)
G05B 9/02 (2006.01)
B60T 8/88 (2006.01)
B60T 13/66 (2006.01)

(52) U.S. Cl.
CPC .......... *B60T 13/662* (2013.01); *B60T 2270/416* (2013.01); *G01P 5/16* (2013.01); *G01P 13/025* (2013.01)
USPC ........ 701/30.1; 701/30.3; 701/30.4; 701/30.5

(56) References Cited

U.S. PATENT DOCUMENTS

| | | | |
|---|---|---|---|
| 4,840,031 A * | 6/1989 | Hribar | 60/338 |
| 5,423,209 A | 6/1995 | Nakaya et al. | |
| 5,933,077 A * | 8/1999 | Vogt et al. | 340/506 |
| 6,205,376 B1 | 3/2001 | Gordon | |
| 6,370,659 B1 * | 4/2002 | Maney | 714/25 |
| 7,257,470 B2 | 8/2007 | Hongerholt et al. | |
| 2004/0186670 A1 * | 9/2004 | Hart | 702/57 |
| 2006/0132269 A1 * | 6/2006 | Kadah | 335/128 |
| 2008/0066540 A1 | 3/2008 | Childers et al. | |

* cited by examiner

SYSTEM AND METHOD FOR DETECTING AND ISOLATING FAULTS IN PRESSURE SENSING OF FLUSH AIR DATA SYSTEM (FADS)

FIELD OF THE INVENTION

The present invention relates to aeronautical engineering, particularly in the field of pressure sensing system of a Flush Air Data system (FADS) employed in space vehicles. The present invention more specifically relates to a system and method for detecting and isolating faults in pressure ports and pressure transducers of the pressure sensing system.

BACKGROUND OF THE INVENTION

Pressure sensing systems utilized by Flush Air Data Systems (FADS) of a space vehicle, high-speed aircrafts and planetary probes generally consist of pressure ports, pneumatic tubing and pressure transducers. The pressure transducers measure surface air pressure from the pressure ports and provide the pressure data input to the FADS processor, which in turn generates air data parameters like angle of attack, slide slip angle, Mach number, and dynamic pressure. These air data parameters are crucial to the guidance and control system of the vehicle for real time control and gust load alleviation so as to protect the vehicle systems from aerodynamic heating, to carry out gain scheduling and for guiding the vehicle along the desired trajectory. Hence, it is essential to maintain the accuracy of these pressure measurements for controlling the vehicles.

However, inaccuracies in the pressure measurements can occur as a result of faults in the pressure transducers or due to the blockage of pressure ports caused by icing or foreign particles. The blocked pressure ports and the faulty pressure transducers create significant deviation of the estimated air data parameters from their true values, which may ultimately lead to loss of control and failure of the vehicle's mission. The Mishap Investigation Board studying the cause of the X-31 experimental aircraft accident of NASA on Jan. 19, 1995, has reasoned that an accumulation of ice in or on the unheated pitot-static system of the aircraft provided false airspeed information to the flight control computers. This led to a false reading of total air pressure data and caused the aircraft flight control system to automatically misconfigure for a lower speed. The aircraft suddenly began oscillating in all axes, pitched up to over 90 degrees angle of attack, went out of control and crashed.

Moreover, there are several other reports of sealing of the pressure ports of the air data systems by insects or due to freezing of trapped water in pneumatic tubing during flight. These events may raise concern about the potential for a takeoff with erroneous airspeed indications and the possibility of inappropriate crew action, which leads to a high-speed rejected takeoff or loss of situational awareness in flight. Therefore, it is always needed to remove the blocked pressure ports and/or the failed transducers from the FADS computations for enhancing the accuracy and reliability of the air data parameter estimation of the FADS in the space vehicles.

The conventional fault detection and isolation (FDI) techniques utilize artificial intelligence algorithm like neural network, for identifying the blocked pressure ports, which are indirect and complex methods that utilize inverse models. In such existing systems, either single or two pressure transducers are connected to one pressure port, which causes difficulty in isolating port blockages from the pressure transducer failures. Further, powering of the single or two transducers is done using a single power supply, which affects the entire pressure measurement when power supply failures occur.

U.S. Pat. No. 7,257,470 describes about a fault isolation method and apparatus in artificial intelligence based air data systems, which is specific to artificial intelligence based air data systems. Such method is an inverse method that requires as many numbers of neural networks as the number of pressure ports. The method mainly depends on the input parameters of the FADS for fault detection in the pressure ports, and thus it requires an inverse model to solve the pressure measurement failures. Such inverse model computations require the output of the pressure estimation at each pressure port in the FADS, which results in computationally expensive and complex process.

GB Patent 2432914A describes about fault detection in artificial intelligence based air data systems, which is also specific to artificial intelligence based air data systems. This method also makes use of large number of neural networks for air data generation and fault detection of the pressure sensors. The main drawback of prior art systems is that they rely on an inverse model for estimating the pressure values at the pressure ports, which complicates the fault detection and isolation (FDI). Also, the existing systems require extensive validation of statistical characteristics like variance of pressure residuals.

With respect to the conventional methods, numerous neural networks are utilized for achieving air data generation and fault detection of the pressure pots in the pressure sensing system of the space vehicles. However, these methods pertain to the inverse model for fault detection, which is very difficult and complex to process on the FADS. In order to overcome the above mentioned deficiencies of the prior art, an FDI scheme with reduced computational load and suitability for onboard implementation point of view is required. Therefore, it is essential to provide an improved system and method for detecting and isolating faults in pressure ports and pressure transducers of the pressure sensing system.

OBJECT OF THE INVENTION

An object of the present invention is to provide a system for detecting and isolating faults in pressure ports and pressure transducers of a pressure sensing system, which enhances the accuracy and reliability of the pressure estimation of the FADS.

Another object of the present invention is to provide a system for detecting and isolating faults in pressure ports and pressure transducers of a pressure sensing system, which achieves accurate and reliable air data generation that is required for controlling space vehicle in real time.

Yet another object of the present invention is to provide a method for detecting and isolating faults in pressure ports and pressure transducers of a pressure sensing system, which is direct, simple, fool proof and accurate.

SUMMARY OF THE INVENTION

According to one aspect, the present invention, which achieves the objectives, relates to a system for detecting and isolating faults in pressure ports and pressure transducers of a pressure sensing system comprising a set of pressure ports flushed to a nose cap of a space vehicle in crucifix form. Three pressure transducers are connected to each pressure port through pneumatic tubes for measuring surface pressure from the pressure ports. Separate power supplying units are connected to the three pressure transducers for powering the pressure transducers at each pressure port. A processing unit is configured to acquire voltage inputs corresponding to the measured surface pressure from the pressure transducers. The processing unit executes one or more levels of fault checking to detect and isolate pressure transducer failures and blockage of the pressure ports based on the voltage inputs. Hence, it is possible to enhance the accuracy and reliability of the pressure estimation of the FADS.

According to another aspect, the present invention, which achieves the objectives, relates to a method for detecting and isolating faults in pressure ports and pressure transducers of a pressure sensing system comprising: distinguishing pressure port blockage failures from pressure transducer failures by cross comparison of surface pressures measured at the pressure ports. Determination is made whether the measured surface pressures lie within a desired range to a coarse level at a specific instant of flight phase. Constant pressure and rate on the measured surface pressures are checked to identify full or partial blockage in the pressure ports and sudden failures on the pressure transducers. Structured sets of angle of attack and sideslip angle estimates are generated from predefined combinations of the pressure ports lying along a vertical and horizontal meridians of a vehicle nose cap. The faults in the pressure ports and the pressure transducers in the vertical and horizontal meridians are detected and isolated based on the structured sets of angle of attack and sideslip angle estimates.

BRIEF DESCRIPTION OF THE DRAWINGS

The invention will be discussed in greater detail with reference to the accompanying Figures.

DETAILED DESCRIPTION OF THE INVENTION

Figure 1:
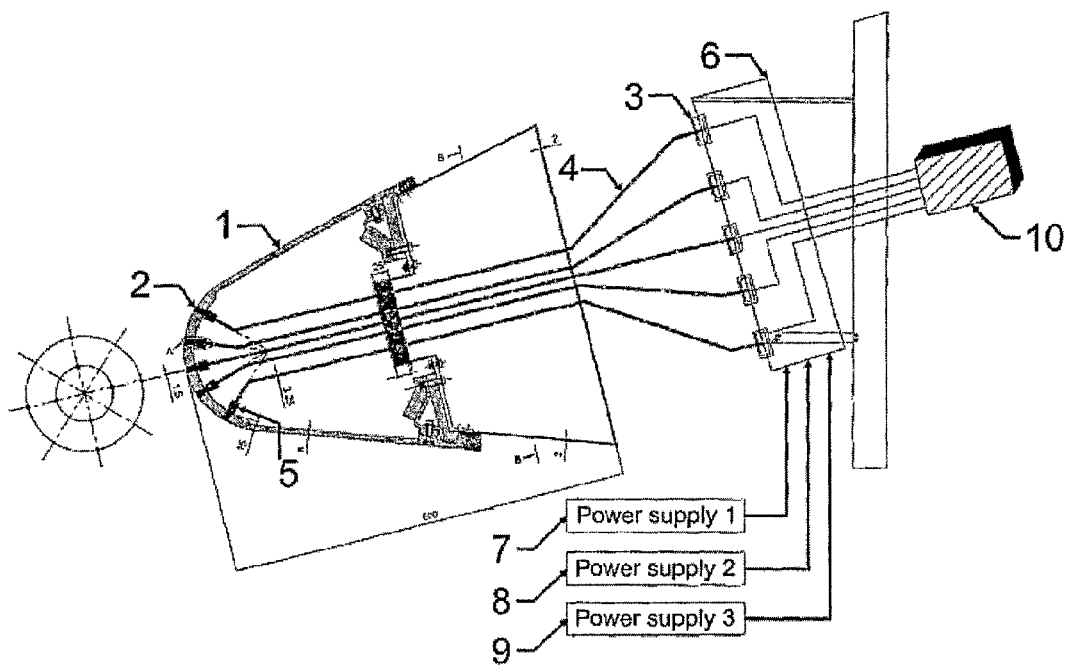
FIG. 1 shows a system for detecting and isolating faults in pressure ports and pressure transducers of a pressure sensing system, in accordance with an exemplary embodiment of the present invention.

Referring to FIG. 1, a system for detecting and isolating faults in pressure ports 2 and pressure transducers 3 of a pressure sensing system is illustrated, in accordance with an exemplary embodiment of the present invention. Such system detects the blocked pressure ports 2 and the defective pressure transducers 3 in the space vehicles. The system comprises nine pressure ports 2, pneumatic tubing 4 and a Flush Air Data System (FADS) processor 10 as major components along with other components. Each of the nine pressure ports 2 is provided with three absolute pressure transducers 3, i.e. totally twenty-seven pressure transducers in the system, for obtaining pressure measurements.

The pressure ports 2 are arranged in a crucifix fashion on a nose cap 1 of the vehicle. Each pressure port 2 is connected to three pressure transducers 3 by means of pneumatic tubing 4. One end of the pneumatic tube 4 is connected to the pressure ports 2 using an adapter 5 while the other end is connected to the pressure transducers 3 mounted on an interface bracket 6. The Inconel pneumatic tube 4 should have inner diameter of 1.75 mm, outer diameter of 3.175 mm and length of 600+/−50 mm for meeting the frequency response requirement of natural frequency greater than 50 Hz and time constant less than 20 milliseconds in the operating flight regime of the FADS.

The pressure transducers 3 are housed in a single package in order to measure pressure and also provide capability to isolate transducer failures from pressure port blockage failures. The pressure transducers 3 can measure the surface pressure from the pressure ports 2 and output analog voltage inputs to the FADS processor 10 of the vehicle based on the surface pressure measured from the pressure ports 2. Three independent power supplies 7, 8 and 9 are used for respectively powering the three pressure transducers 3 at the pressure ports 2, which avoids loss of all pressure data at the pressure ports 2 caused due to failure of single power supply.

Furthermore, the analog voltages from the pressure transducers 3 are routed to the digital signal processor 10 working at 32 MHz clock frequency, through the interface bracket 6. The 27 pressure readings in the form of analog voltages are digitized using an analog to digital converter inside the FADS processor 10. The 27 pressure readings are acquired at a rate of 25 milliseconds by the FADS processor 10. The accuracy of the pressure transducers 3 and the analog to digital converter is selected in such a way that the overall accuracy in pressure measurement is better than 100 Pascal. Subsequently, the four levels of faults checking are carried out using these pressure readings from the pressure transducers 3 to detect failures of the pressure transducers 3 and/or blockage of the pressure ports 2.

Figure 4:
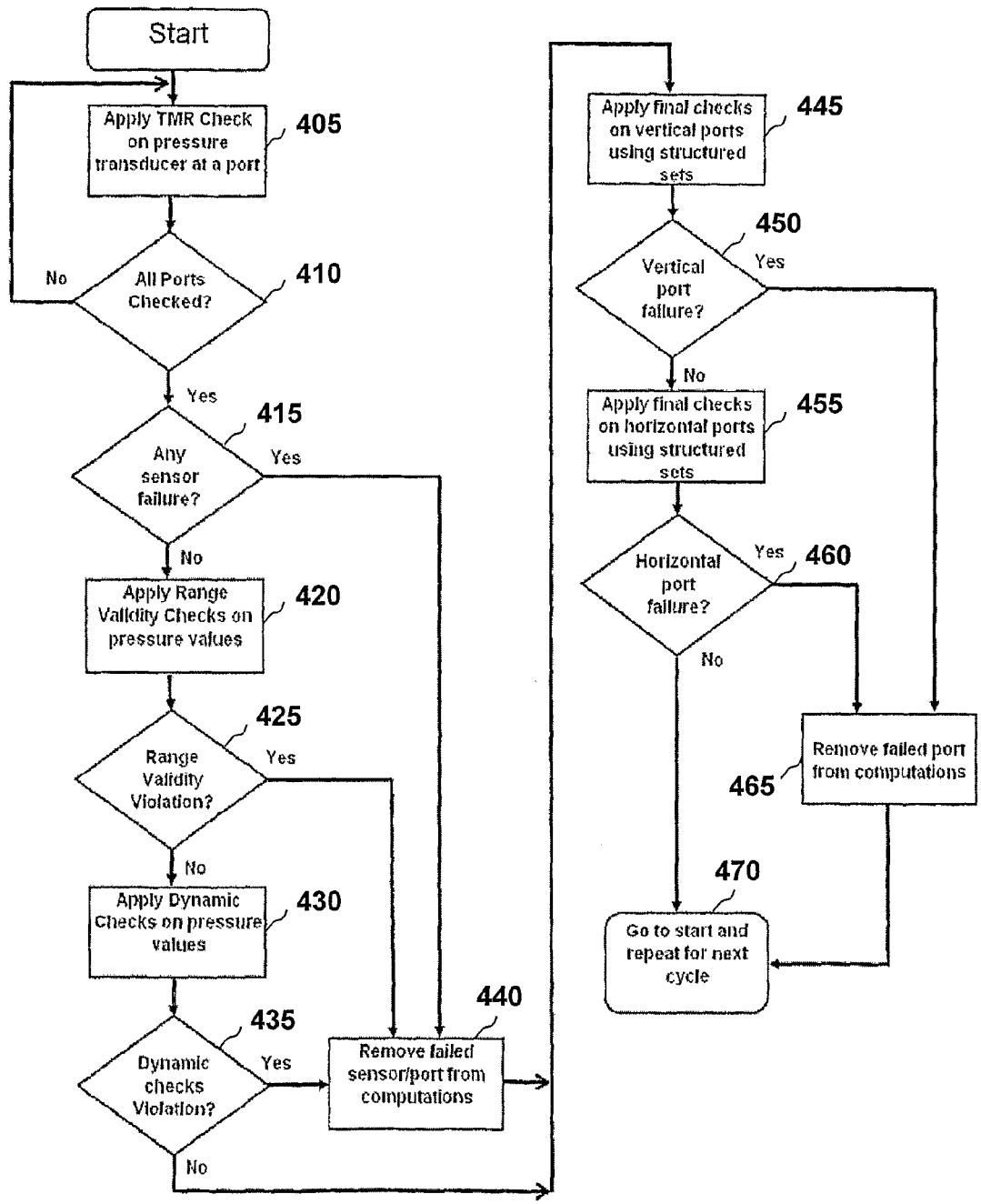
FIG. 4 illustrates a flowchart of a method for detecting and isolating faults in pressure ports and pressure transducers of a pressure sensing system, in accordance with an exemplary embodiment of the present invention.

Referring to FIG. 4, a flowchart of a method for detecting and isolating faults in the pressure ports 2 and the pressure transducers 3 of the pressure sensing system is illustrated, in accordance with an exemplary embodiment of the present invention. The fault detection and isolation (FDI) method utilizes four levels of checking the faults in the pressure ports 2 and the pressure transducers 3. In the first level, the FDI check is carried out as Triple Modular Redundant (TMR) logic check on the pressure transducers 3 at each pressure port 2, as illustrated at step 405. Each pressure port 2 exhibits the three absolute pressure transducers 3 that measure the surface pressure at the particular pressure port location. Since the powering of the three transducers 3 is done using three independent power supplies 7, 8 and 9, the failure of single power supply does not affect the pressure measurement.

Under no-failure condition of the pressure transducers 3, all the three pressure readings at the pressure ports 2 should match within a threshold value. Failure of the pressure transducers 3 can be detected by cross comparison (TMR logic) of the three pressure readings at the pressure port 2. This procedure should be done for all the nine pressure ports 2, as depicted at step 410. If any transducer failures are detected, then the failed transducer 3 can be removed from FADS computations, as shown at steps 415 and 440. However, this TMR logic check cannot detect fully or partially blocked ports 2 or simultaneous failure of two pressure transducers 3 at the pressure port 2. Hence, the next level of check, namely range validity check, is done on the measured pressure readings.

Figure 2:
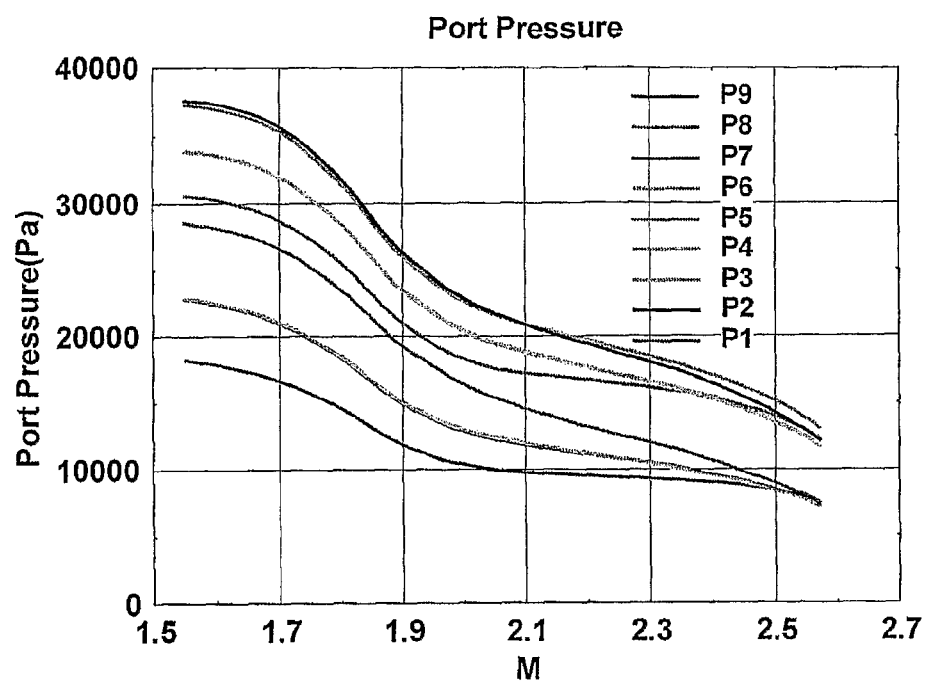
FIG. 2 illustrates a graph plotted between port pressure and Mach number, in accordance with principles of the present invention.

In the second level, the range validity check is done to determine whether the measured pressures lie within the expected range to a very coarse level at the particular instant of the flight phase, as mentioned at step 420. Based on the pressure values expected in the space vehicle as shown in FIG. 2 depicting a graph plotted between port pressure and Mach number, threshold levels of 50,000 Pa and 2500 Pa are fixed for pressure values around Mach number 2, i.e. to say that the region in which the Mach number is >2 should have a value <50000 Pascal whereas the pressures should be >2500

Pa for the region below Mach number 2, which concludes that if values of the corresponding ports 2 are outside this range, then the ports 2 are fully blocked ports. If any transducer or port failures are detected by the range validity check, then the failed transducer 3 or port 2 can be removed from FADS computations, as shown at steps 425 and 440.

In the third level, the dynamic behavior check is applied on the measured pressures, which includes constant pressure check and rate check, as illustrated at step 430. In the constant pressure check, a record on the highest and lowest pressure readings at every pressure port 2 is maintained for block duration of every 100 seconds. If the difference between the highest and lowest pressure readings during any block is less than a specified threshold (<100 Pascal typical value), then the specific port 2 is removed from the FADS computations, as depicted at steps 435 and 440. This constant pressure check is to be disabled during cruise operations. Similarly, in rate check, it is determined whether the reading at the pressure port 2 is changed by more than a threshold value (5000 Pascal typical value) during one computational update cycle time of 25 milliseconds, If so, then that pressure port 2 is removed from the FADS computations. The constant pressure check along with the rate check can enable to identify fully and partially blocked pressure ports 2 and sudden failures occurring in the pressure transducers 3.

Finally, the fourth level of checking is performed based on the generation of structured sets of angle of attack and sideslip angle estimates. The faults in the pressure ports 2 or the pressure transducers 3 in the FADS cause deviation of the angle of attack and sideslip angle estimates within a "structured set". These structured sets are generated from pre-defined combinations of the pressure ports 2 lying along the vertical and horizontal meridian of the FADS nose cap 1 of the vehicle. The faults in the pressure ports 2 or the pressure transducers 3 lying along the vertical meridian are detected and isolated using the angle of attack estimates, whereas the faults of the pressure ports 2 or the pressure transducers 3 lying along the horizontal meridian are detected and isolated using the angle of sideslip estimates.

Figure 3:
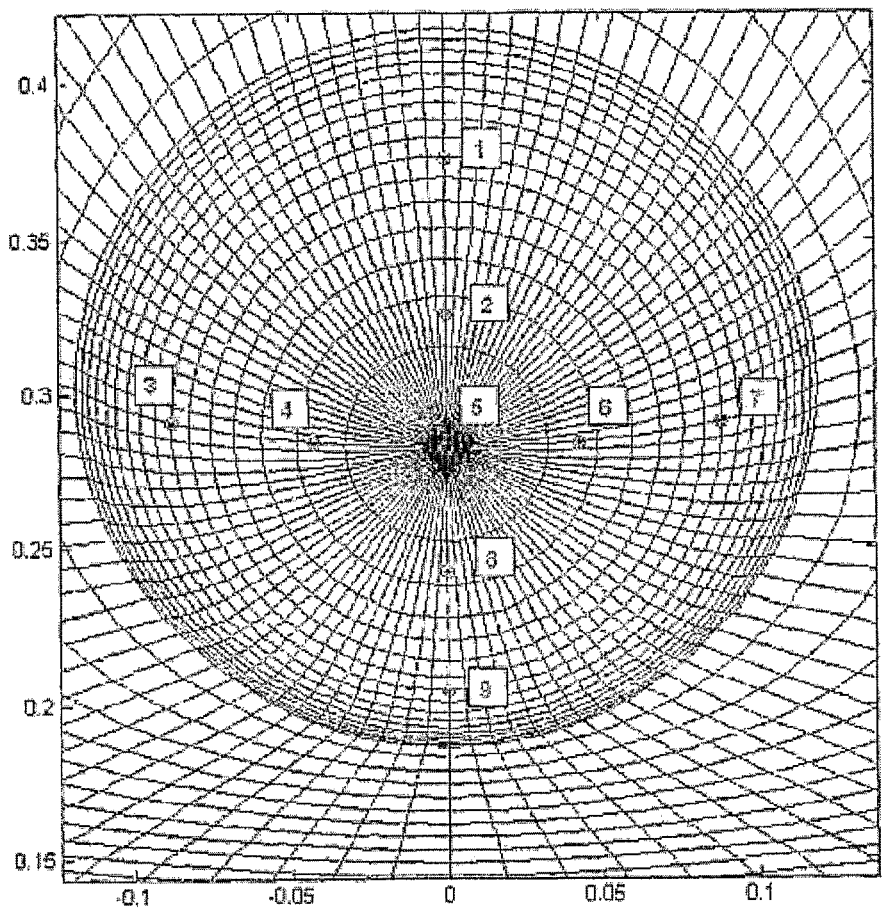
FIG. 3 illustrates geometry and numbering scheme of the pressure ports, in accordance with principles of the present invention.

Moreover, the pressure port geometry of a typical system for the FDI scheme is shown in FIG. 3 depicting geometry and numbering scheme of the pressure ports 2, in accordance with principles of the present invention. In this system consideration, the nine pressure ports 2 are arranged in a crucifix fashion along the vertical and horizontal meridians. The pressure ports 2 along the vertical meridian are numbered as 1, 2, 5, 8 and 9. The remaining four pressure ports 2 along the horizontal meridian are numbered as 3, 4, 6 and 7.

The failure of pressure ports 2 or transducers 3 along the vertical meridian, i.e. failure of ports numbered 1, 2, 5, 8 and 9, are identified using a structured set of angle of attack estimates, as depicted at steps 445. The structured set consists of ten estimates of angle of attack, where each angle of attack estimate is formed from the three pressure ports 2. The structured set 1 of the ten angle of attack estimates using the pressure ports 2 along the vertical meridian is shown in Table 1. The detection of faults in the pressure ports 2 and/or the pressure transducers 3 in the vertical meridian is done by checking the dispersion of outliers from the median of the structured set.

In this FDI check of the vertical meridian ports, the ten angle of attack estimates of the structured set shown in Table 1 are arranged in an ascending or descending order in order to find the median of the ten angle of attack estimates. If the total number of estimates is an even value, then the median is the average of the two centre values of the structured set. Then, the outlier in the entire structured set is identified by finding the angle of attack estimate that lies farthest from the median. The difference between the angle of estimate value of the outlier and the median value is detected.

TABLE 1

Structured set 1 of angle of attack estimates for vertical port failure isolation
Set 1

| Angle of attack estimate No | Ports from which estimate is formed |
|---|---|
| 1 | 1, 2, 5 |
| 2 | 1, 2, 8 |
| 3 | 1, 2, 9 |
| 4 | 1, 5, 8 |
| 5 | 1, 5, 9 |
| 6 | 1, 8, 9 |
| 7 | 2, 5, 8 |
| 8 | 2, 5, 9 |
| 9 | 2, 8, 9 |
| 10 | 5, 8, 9 |

If the difference in magnitude between the outlier and the median is situated within a threshold, then all the five ports in the vertical meridian are good. If the difference between the outlier and the median is more than the specified threshold, then one of the three ports that constituted the outlier is faulty. These three ports are identified to be in the faulty list, where the remaining two ports in the vertical meridian are good. Thereafter, a second set of three structured estimates is formed using these two good ports and one port each from the faulty list. Finally, out of this second structured set, the two estimates can match within a threshold and the port in the outlier of the second structured set taken from the faulty list is declared faulty. If any port failure is detected in the vertical meridian, then the failed port is removed from the computations, as shown at step 450 and 465.

Similarly, the failure of remaining four pressure ports 2 or transducers 3 along the horizontal meridian, i.e. failure of ports numbered 3, 4, 6 and 7, are identified using a structured set of angle of sideslip estimates, as illustrated at step 455. The structured set consists of four sets, each containing ten estimates of angle of sideslip, where each estimate is formed from the three pressure ports 2. The combinations of three ports in each of the four structured sets mentioned above are selected such that they satisfy the conditions that all the ten estimates within a structured set should have at least one off vertical meridian, horizontal port common to them and at least two of the ports 2 in a sideslip estimate are formed from ports 2 lying along the vertical meridian.

In addition, the four structured sets (set 2 to set 5) each containing ten angles of sideslip estimates and the pressure ports 2 from which they are formed are. given in Table 2. The faults in the pressure ports 2 and/or the pressure transducers 3 lying along the horizontal meridian are detected by checking absolute magnitude of median of a structured set. In this FDI check of the horizontal meridian ports, operation is made on one set of angle of sideslip estimates shown in Table 2, at a time. The angle of sideslip estimates are arranged in an ascending or descending order and the median of the ten angle of sideslip estimates are determined. If the total number of estimates is an even value, then the median is the average of the two centre values of the structured set.

TABLE 2

Structured sets 2 to 5 of angle of sideslip estimates
for horizontal port failure isolation

| Angle of sideslip estimate No | Ports from which estimate is formed |
|---|---|
| Set 2 | |
| 1 | 1, 3, 9 |
| 2 | 2, 3, 9 |
| 3 | 5, 3, 9 |
| 4 | 5, 3, 8 |
| 5 | 5, 3, 2 |
| 6 | 5, 3, 1 |
| 7 | 1, 3, 2 |
| 8 | 9, 3, 8 |
| 9 | 2, 3, 8 |
| 10 | 1, 3, 8 |
| Set 3 | |
| 11 | 1, 7, 9 |
| 12 | 2, 7, 9 |
| 13 | 5, 7, 9 |
| 14 | 5, 7, 8 |
| 15 | 5, 7, 2 |
| 16 | 5, 7, 1 |
| 17 | 1, 7, 2 |
| 18 | 9, 7, 8 |
| 19 | 2, 7, 8 |
| 20 | 1, 7, 8 |
| Set 4 | |
| 21 | 1, 4, 9 |
| 22 | 2, 4, 9 |
| 23 | 5, 4, 9 |
| 24 | 5, 4, 8 |
| 25 | 5, 4, 2 |
| 26 | 5, 4, 1 |
| 27 | 1, 4, 2 |
| 28 | 9, 4, 8 |
| 29 | 2, 4, 8 |
| 30 | 1, 4, 8 |
| Set 5 | |
| 31 | 1, 6, 9 |
| 32 | 2, 6, 9 |
| 33 | 5, 6, 9 |
| 34 | 5, 6, 8 |
| 35 | 5, 6, 2 |
| 36 | 5, 6, 1 |
| 37 | 1, 6, 2 |
| 38 | 9, 6, 8 |
| 39 | 2, 6, 8 |
| 40 | 1, 6, 8 |

Thereafter, checking can be made whether the absolute magnitude of the identified median is less than a specified threshold. If the absolute magnitude of the identified median is less than a specified threshold, then the port common to the ten sideslip estimates in the specified structured set is good. Whereas, if the absolute magnitude of the identified median is greater than the specified threshold, then the port common to the ten angle of sideslip estimates in the specified structured set is faulty. The above steps are repeated for all the four structured sets to detect and isolate any faulty port 2 and/or pressure transducer 3 in the horizontal meridian. Once the fault is detected in the structured set, then the isolation of the faulty port or transducer is carried out subsequently through logical reasoning, as mentioned at steps 460 and 465. Thereafter, as depicted at step 470, the above processes are repeated for next cycle of FADS computations.

For example, let us consider that the outlier identified is estimate number 5 in Table 1, which is an illustrative example for detecting the failure of ports in the vertical meridian. As this estimate is formed using the ports numbered 1, 5 and 9, these ports are kept in the faulty list, which indicates that the ports numbered 2 and 8 are good. Then, the second set of structured estimates is formed using the port combinations, such as ports numbered 2, 8, 1, ports numbered 2, 8, 5 and ports numbered 2, 8, 9. Cross comparison among this second set of structured angle of attack estimates is carried out to identify the outlier in the set. The first, second or third estimate can be the outlier depending upon whether the port numbered 1, 5 or 9 is the failed port. In this manner, one port failure along the vertical meridian can be detected and isolated from the FADS computations.

Similarly, let us consider a specified threshold is 15, which is an illustrative example for detecting the failure of ports in the horizontal meridian. According to Table 2, if the horizontal port numbered 3 has failed, then the median in the structured set 2 can have an absolute magnitude greater than 15 indicating that the port common to that structure set, i.e. port numbered 3 is faulty. The absolute magnitude of median in the sets 3, 4 and 5 exhibits a magnitude less than 15 indicating that these ports are healthy. In this manner, faults of ports lying along the horizontal meridian can be detected and isolated from the FADS computations.

We claim:

1. A method for detecting and isolating faults in pressure ports and pressure transducers of a pressure sensing system, comprising:
   distinguishing pressure port blockage failures from pressure transducer failures by cross comparison of surface pressures measured at a plurality of pressure ports;
   determining whether the measured surface pressures lie within a desired range to a coarse level at a specific instant of flight phase;
   checking constant pressure and rate on the measured surface pressures to identify full or partial blockage in said plurality of pressure ports and sudden failures on a plurality of pressure transducers;
   generating one or more structured sets of angle of attack and sideslip angle estimates from predefined combinations of said plurality of pressure ports lying along a vertical and horizontal meridians of a vehicle nose cap; and
   detecting and isolating the faults in said plurality of pressure ports and said plurality of pressure transducers in the vertical and horizontal meridians based on said one or more structured sets of angle of attack and sideslip angle estimates.

2. The method as claimed in claim 1, wherein the checking of constant pressure comprises detecting and isolating the blocked pressure port and the failed pressure transducer if the difference between highest and lowest readings of the surface pressures for a predefined block duration is less than a desired threshold value.

3. The method as claimed in claim 1, wherein the checking of rate comprises detecting and isolating the blocked pressure port and the failed pressure transducer if the measured surface pressures are more than a desired threshold value during one computational update cycle time.

4. The method as claimed in claim 1, wherein the faults in said plurality of pressure ports and said plurality of pressure transducers in the vertical meridian are detected and isolated by checking dispersion of outlier from the median of said one or more structured sets of angle of attack estimates.

5. The method as claimed in claim 1, wherein the faults in said plurality of pressure ports and said plurality of pressure transducers in the horizontal meridian are detected and isolated by checking absolute magnitude of median of said one or more structured sets of sideslip angle estimates.

6. The method as claimed in claim 1, wherein said one or more structured sets of angle of attack and sideslip angle estimates are configured from at least three pressure ports of said plurality of pressure port.

7. The method as claimed in claim 1, wherein the blocked pressure port and the failed pressure transducer are isolated from computations through logical reasoning.

8. The method as claimed in claim 4, wherein the checking of dispersion of outliers from the median of said one or more structured sets of angle of attack estimates, further comprising:
   determining the median of the angle of attack estimates after arranging the angle of attack estimates in an ascending or descending order;
   identifying the outlier in said one or more structured sets by finding the angle of attack estimates that lies farthest from the median of the angle of attack estimates;
   determining the difference between the outlier and the median of the angle of attack estimates; and
   representing said plurality of pressure ports in the outlier as faulty ports, if the difference between the outlier and the median is more than a desired threshold; and
   forming a second structured set of angle of attack estimates using the remaining pressure ports and one of the faulty ports and isolating the pressure port in the outlier of said second structured set.

9. The method as claimed in claim 5, wherein the checking of dispersion of outliers from the median of said one or more structured sets of sideslip angle estimates, further comprising:
   determining the median of the sideslip angle estimates after arranging the sideslip angle estimates in an ascending or descending order;
   checking whether the absolute magnitude of the determined median of the sideslip angle estimates is less than a desired threshold; and
   isolating the pressure port common to said one or more structured sets of sideslip angle estimates, if the absolute magnitude of the determined median of the sideslip angle estimates is more than the desired threshold.

10. The method as claimed in claim 9, wherein said one or more structured sets of sideslip angle estimates are formed with at least one pressure port in the horizontal meridian common to said plurality of pressure ports and remaining ports in the structured set taken from the vertical meridian.

\* \* \* \* \*